United States Patent [19]
Koike

[11] Patent Number: 5,662,151
[45] Date of Patent: Sep. 2, 1997

[54] VENEER PEELING KNIFE AND A METHOD OF FIXING A KNIFE ADJUSTING BOLT OF SAID VENEER PEELING KNIFE

[75] Inventor: Masaru Koike, Obu, Japan

[73] Assignee: Meinan Machinery Works, Inc., Obu, Japan

[21] Appl. No.: 613,129

[22] Filed: Mar. 8, 1996

[51] Int. Cl.$^6$ .................. B27L 5/00; B27M 1/00
[52] U.S. Cl. ............ 144/365; 144/209.1; 144/212; 144/329; 241/167
[58] Field of Search ............... 241/167; 118/70, 118/100, 126; 144/209.1, 212, 218, 365, 329, 211, 213

[56] References Cited

U.S. PATENT DOCUMENTS

| 812,078 | 2/1906 | Norton | 144/212 |
| 3,164,492 | 1/1965 | Schmitt et al. | 144/212 X |
| 3,204,673 | 9/1965 | Nordin | 144/212 |

FOREIGN PATENT DOCUMENTS

| H641122 | 8/1984 | Japan . | |
| 32251 | 2/1912 | Sweden | 144/212 |

*Primary Examiner*—W. Donald Bray
*Attorney, Agent, or Firm*—Brooks Haidt Haffner & Delahunty

[57] ABSTRACT

A method of fixing an adjusting bolt of a veneer peeling knife which is usually performed after adjusting the knife in a knife setting gauge to position its cutting edge at a desired height. The adjusting bolt is fixed by forcing the adjusting bolt by a fixing member in such a direction that the advancing side flank of the external thread of the adjusting bolt is kept in pressed contact with the lower side flank of the internal thread of a threaded hole formed in the knife bottom and receiving therein the adjusting bolt by thread engagement. The fixing member may be provided by a rigid member disposed below the knife bottom surface and formed with a threaded hole through which the adjusting bolt is inserted by thread engagement so that forcing the fixing member upward by a pressing member such as a bolt in a direction that effects the pressed contact between the above two flanks fixes the adjusting bolt securely to place. The fixing member is provided by any suitable resilient material such as silicon rubber. Causing the resilient fixing member to be deformed so as to urge the adjusting bolt in a direction perpendicular to the axis thereof, the above flanks are pressed in tight contact with each other by the wedging action thereby to fix the adjusting bolt. A veneer peeling knife itself can be equipped with a device for fixing the knife adjusting bolt.

20 Claims, 14 Drawing Sheets

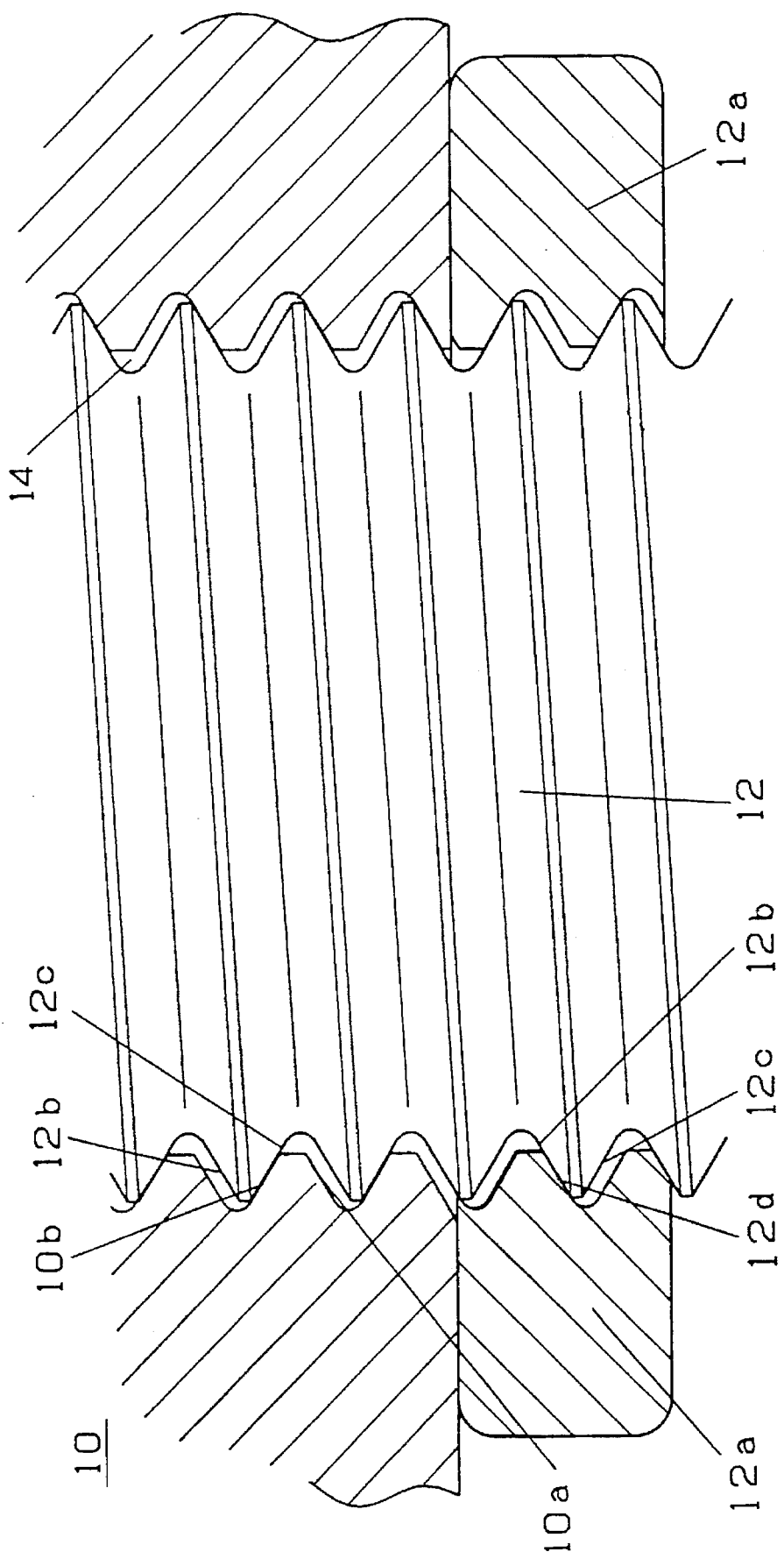

VENEER PEELING KNIFE AND A METHOD OF FIXING A KNIFE ADJUSTING BOLT OF SAID VENEER PEELING KNIFE

BACKGROUND OF THE INVENTION

The present invention relates to a method of fixing a knife adjusting bolt provided at the bottom of a veneer peeling knife of a veneer lathe and used for adjusting the height of a ground cutting edge of the knife with the aid of a knife setting gauge. More specifically, the invention relates to the above knife adjusting bolt fixing method which expedites the knife setting procedure and also prevents the adjusted bolt from becoming loose and the height of the knife cutting edge from being brought out of adjustment during veneer peeling operation. The present invention also relates to a veneer peeling knife itself.

For the sake of aiding in understanding of the underlying problems of the invention, reference is made to FIGS. 12, 13 and 14. FIG. 12 shows a conventional veneer peeling knife 10 mounted in a knife carriage 13 of a veneer lathe. The knife 10 has a plurality of adjusting bolts 12 (only one bolt being shown in the drawing) inserted into respective threaded holes formed in the bottom of and along the longitudinal direction of the knife. For adjustment of the knife 10, each adjusting bolt 12 is screwed into the threaded hole and turned so that the knife is set with its cutting edge positioned at a predetermined elevation or height. For fixing the adjusting bolt 10 after the knife cutting edge has been set at the desired height, a lock nut 12a has been used which is provided on the bolt 12 and tightened into pressing abutment with the knife bottom surface. As is well known in the art, such adjustment of the knife 10 is usually performed on a knife setting gauge as indicated by reference numeral 1 in FIG. 1.

According to this conventional method, when the knife 10 is just adjusted for the desired cutting edge height with use of the knife adjusting bolt 12, the external thread of the adjusting bolt is engaged with the internal thread of the bolt receiving hole 14 such that the load of the knife 10 due to its weight is received by contact between the lower side flank (or slope) 10a of the internal thread of the hole 14 and the advancing side flank 12b of the external thread of the adjusting bolt 12, as illustrated in FIG. 13. When the lock nut 12a is then turned until it contacts the knife bottom surface and further turned, the lock nut pushes the knife 10 upward, displacing the lower side flank 10a of the internal thread of the hole 14 clear of the advancing side flank 12b of the adjusting bolt thread. When the lock nut 12a is further turned until the upper side flank 10b of the internal thread of the hole 14 is tightly pressed against the retracting side flank 12c of the external thread of the adjusting bolt 12 as shown in FIG. 14, the knife load is then received by contact engagement between the advancing side flank 12b of the external thread of the adjusting bolt 12 and the retracting side flank 12d of the internal thread of the lock nut 12a and also contact between the lock nut top surface and the knife bottom surface. It is noted that for the sake of illustration the threads of knife adjusting bolt 12, adjusting bolt receiving hole 14 and lock nut 12a are shown in FIGS. 13 and 14 with exaggerated lost motion or backlash between the engaged threads.

Apparently, tightening the lock nut 12a according to the above-described conventional method brings the height of the knife cutting edge out of adjustment by the amount corresponding to the backlash between the external thread of the adjusting bolt 12 and the internal thread of the hole 14.

To correct the adjustment, the lock nut 12a is loosened and an adjustment is made again by turning the adjusting bolt 12. It has been a usual practice to repeat this procedure until the correct height of the knife cutting edge is obtained. Apparently, this does not only call for a technique of skilled maintenance personnel, but also takes a remarkable length of time.

During veneer peeling operation of the lathe, the veneer knife is subjected to a load acting in downward direction due not only to the knife weight but also to veneer peeling action, and a part of this load is applied to the retracting side flank 12d of the lock nut 12a which has a smaller number of threads, as counted in axial cross-sectional view as seen in FIG. 14, than the adjusting bolt 12 does. Therefore, the lock nut 12a tends to become loose or deformed under the influence of the load, with the result that the knife cutting edge is lowered from the adjusted height during veneer peeling operation. An increased number of adjusting bolts 12 may be used so as to reduce the magnitude of the load applied to each lock nut 12a, although this will only make the knife adjusting procedure more troublesome and time-consuming.

SUMMARY OF THE INVENTION

Therefore, an object of the present invention is to provide a method of fixing a knife adjusting bolt of a veneer peeling knife without using a conventional lock nut.

Another object of the invention is to provide an adjusting bolt fixing method which expedites the knife setting procedure by facilitating fixing of the knife adjusting bolt.

Still another object of the invention is to provide an adjusting bolt fixing method which prevents the knife from being brought out of adjustment due to the load applied thereto during veneer peeling operation.

Still another object of the invention is to provide a veneer peeling knife per se which is equipped with a device for fixing the knife adjusting bolt.

According to the method of the present invention, after knife adjustment by the adjusting bolt to position the top cutting edge of the knife is over, the bolt is fixed by forcing the same bolt by fixing means so that the advancing side flank of the external thread of the adjusting bolt is kept in pressed contact with the lower side flank of the internal thread of a threaded hole formed in the knife bottom and receiving therein the adjusting bolt by thread engagement. The fixing means may include a rigid member which is disposed below the bottom surface of the knife and formed with a threaded hole through which the adjusting bolt is inserted by thread engagement. Forcing of the adjusting bolt is accomplished by pressing means such as a bolt which presses the fixing member in a direction that effects the pressed contact between the above two flanks of the external and internal threads of the adjusting bolt and its receiving threaded hole. For fixing the adjusting bolt securely, the rigid fixing member should be spaced from the bottom surface of the knife at least before the adjusting bolt is fixed.

When the portion of the adjusting bolt that projects out from the knife bottom is relatively long and, therefore, the bolt should be forced upward as perpendicularly as possible relative to the knife bottom surface, the knife should preferably be provided with means for maintaining the rigid fixing member substantially in parallel to the bottom surface of the knife so that the bolt is not subjected to a force acting to bend the same bolt during peeling operation of the veneer lathe.

In one possible form of the veneer peeling knife, it has formed in the bottom thereof adjacent the threaded hole at least one second threaded hole, and the rigid fixing member has formed therethrough a plain hole adjacent the threaded hole in the fixing member. The pressing means is provided by at least one bolt inserted into the second threaded hole in the knife bottom by thread engagement and through the plain hole in the rigid member. By so arranging, screwing the pressing bolt with its head in contact with the bottom surface of the rigid fixing member into the second threaded hole in the knife bottom pushes the rigid member upward and, simultaneously, pulls the knife downward or toward the rigid fixing member, with the result that the above two flanks of the adjusting bolt and its receiving hole are pressed tight and, therefore, the adjusting bolt can be fixed securely. The pressing means may include two pressing bolts disposed on opposite sides of the adjusting bolt.

The fixing means may be made of any suitable deformable resilient material such as silicon rubber. The resilient fixing member is disposed below the bottom surface of the knife and, after knife adjustment is over, it is caused to deform so as to urge at least part of the outer periphery of the adjusting bolt in the direction substantially perpendicular to the axis of the same bolt. Such resilient fixing member is usable when the mating threads of the adjusting bolt and its threaded hole are formed by sloped flanks. That is, by deforming the fixing member, the adjusting bolt is urged laterally and the sloped flank of the advancing side flank of the adjusting bolt thread is pressed tight against the mating lower side flank of the internal thread of the hole by the wedging action of the threads thereby to fix the adjusting bolt in place. The pressing means for pressing the resilient fixing member may be provided by a bolt which is arranged so as to press the fixing member for deformation when the pressing bolt is screwed in its forward movement direction.

The above and other objects and features of the invention will become apparent from the following detailed description of the preferred embodiments of the invention in conjunction with the accompanying drawings.

BRIEF DESCRIPTION OF THE DRAWINGS

FIG. 14 is a view similar to FIG. 13, but showing a state where the lock nut has been tightened.

DETAILED DESCRIPTION OF PREFERRED EMBODIMENTS

Figure 1:
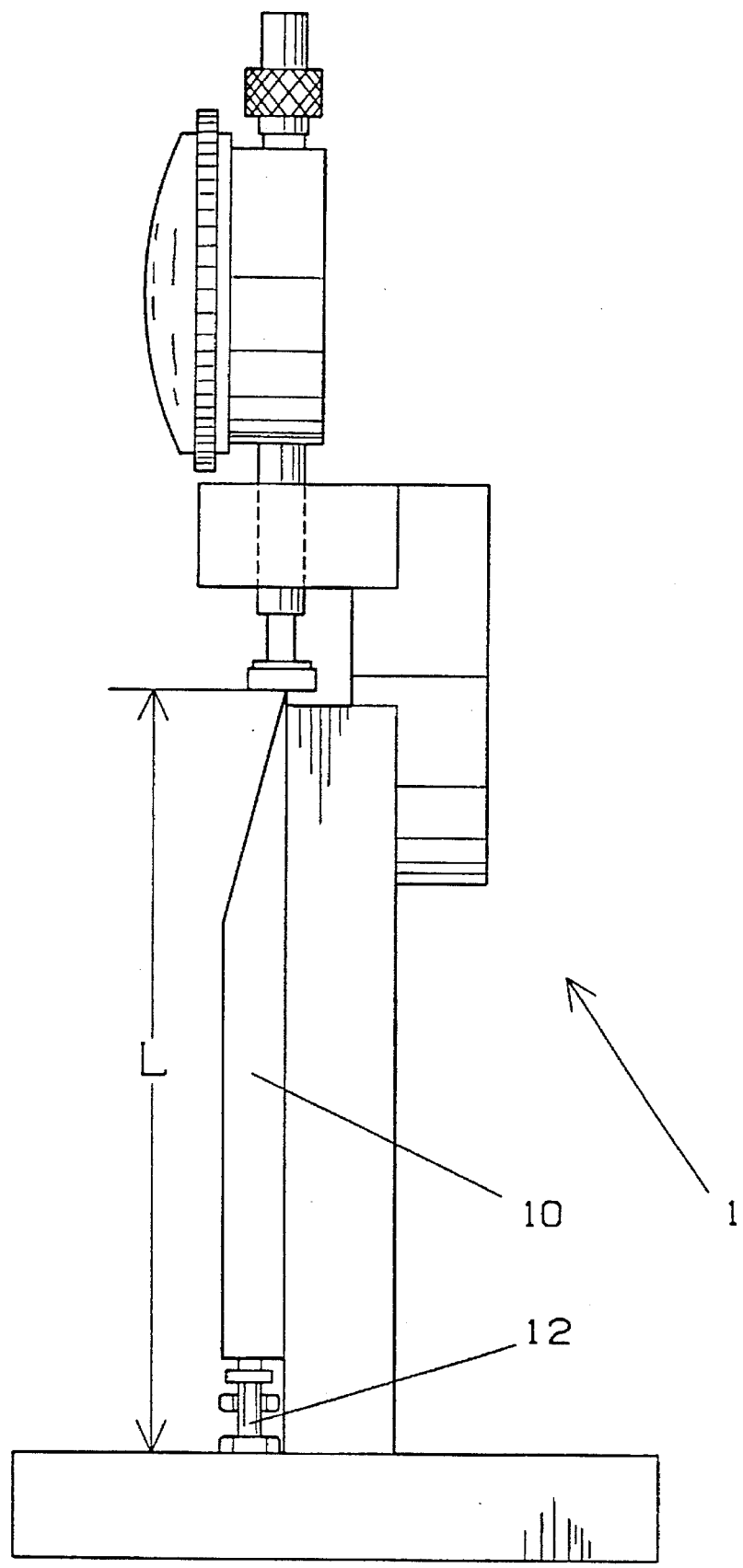
FIG. 1 is a side view of a ground veneer peeling knife of the present invention as placed in a knife setting gauge.
Figure 2:
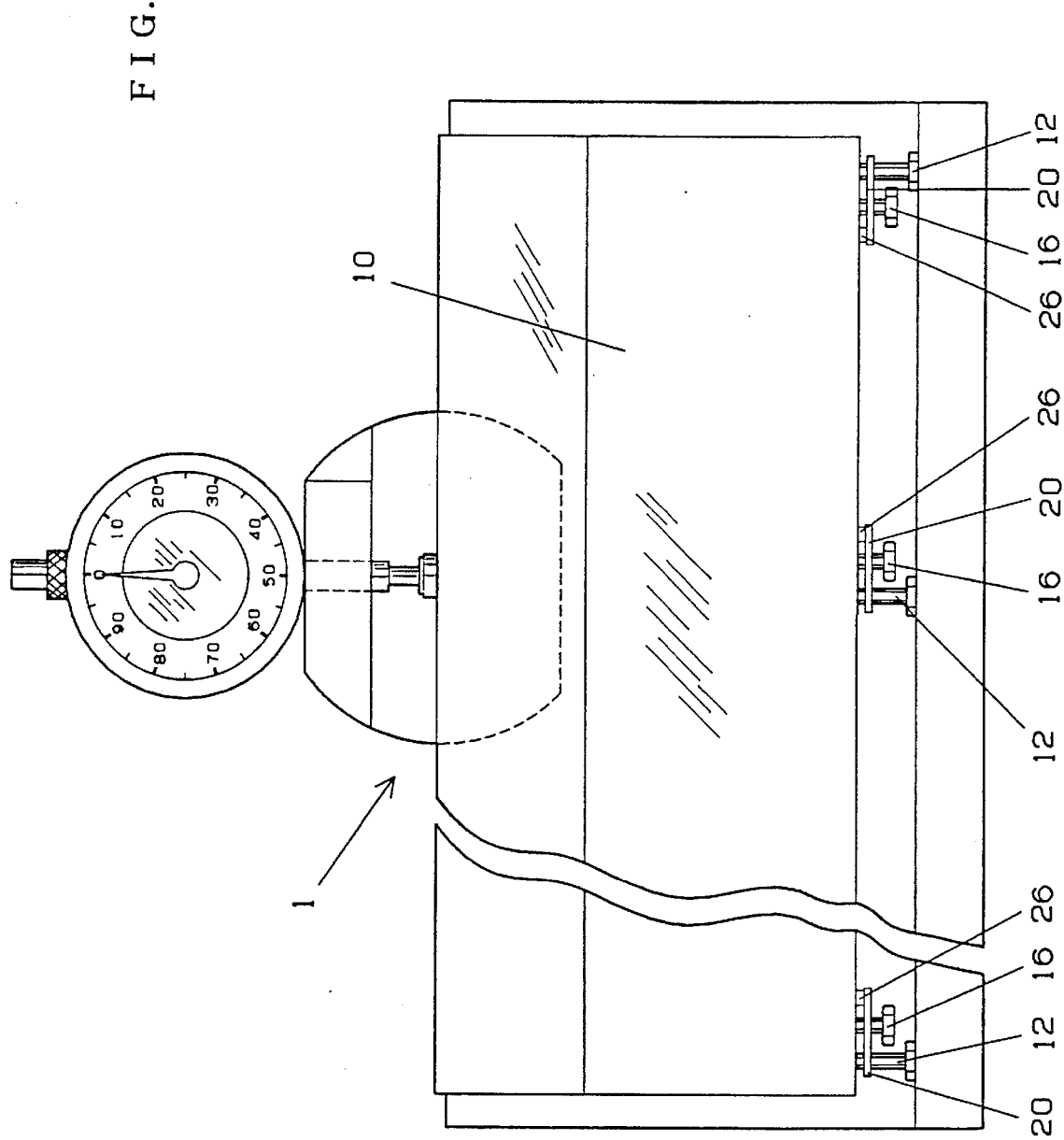
FIG. 2 is a front view showing the veneer peeling knife and the knife setting gauge of FIG. 1.

EMBODIMENT 1:

Referring firstly to FIGS. 1 and 2, a ground or reground veneer peeling knife 10 according to the present invention is shown. The knife 10 is placed in a knife setting gauge 1 for adjustment for a predetermined height "L" by using a plurality of knife adjusting bolts 12 inserted into respective threaded holes 14 (FIG. 3) formed in the bottom of the knife at intervals along the knife length.

Figure 3:
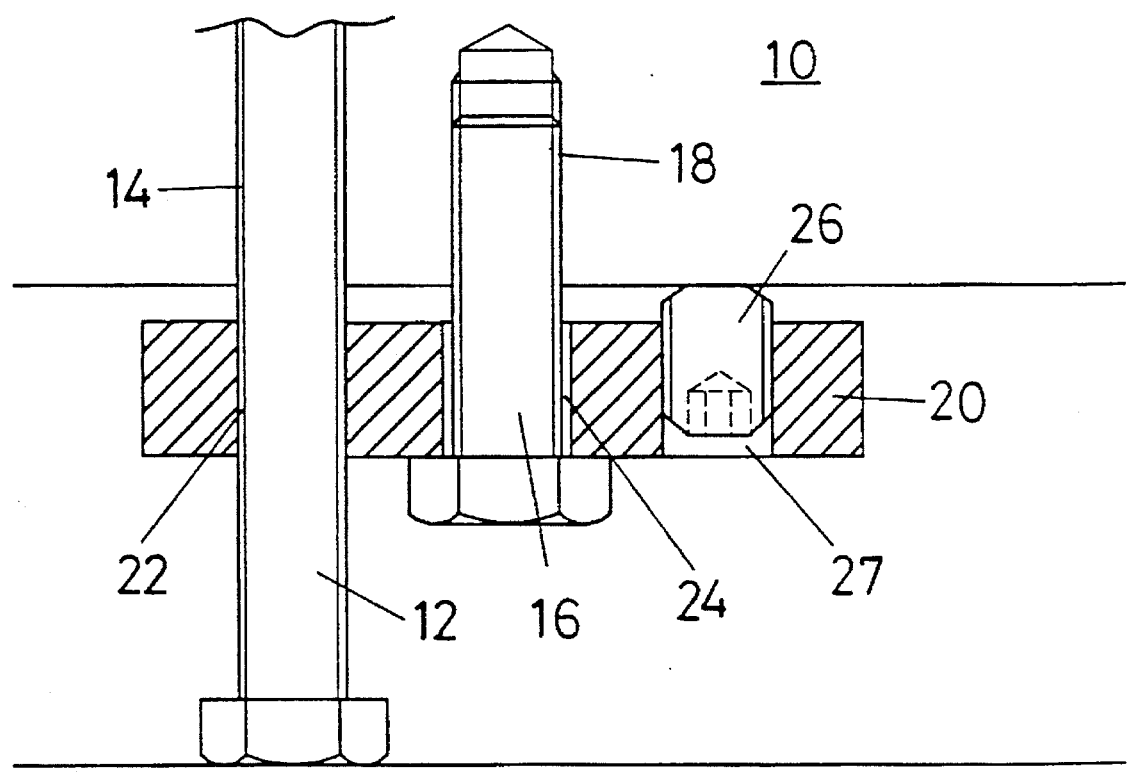
FIG. 3 is an enlarged front view showing a bottom portion of the knife together with a knife adjusting bolt and its associated parts for fixing the bolt.

Reference is now made to FIG. 3 showing in an enlarged view one of the knife adjusting bolts 12 and its relevant parts. It is assumed that FIG. 3 shows a state wherein the veneer knife 10 has been adjusted for the above height "L" and its adjusting bolt 12 has been fixed according to the method of the present invention. As mentioned earlier, the knife adjusting bolt 12 is screwed into the threaded hole 14 formed in the knife bottom. Adjacent to the adjusting bolt hole 14 is formed another threaded hole 18 into which a clamp bolt 16 is screwed. These two bolts 14, 18 are bridged by a fixing member 20 which is made of a rigid material and disposed just below the knife bottom surface. The fixing member 20 has formed therethrough a first threaded hole 22 in one lateral side thereof for receiving therethrough the adjusting bolt 12, a center plain, or non-threaded, hole 24 through which the clamp bolt 16 passes freely with its head pressed in tight contact with the lower surface of the fixing member 20, and a second threaded hole 27 in the opposite lateral side. A stop Allen bolt 26 is screwed into the hole 27 in the fixing member 20 with its top in contact with the knife bottom surface. As seen in FIG. 3, the fixing member 20 is positioned at a spacing from and substantially in parallel to the knife bottom surface, bridging the knife adjusting bolt 12 and the clamp bolt 16.

The following will describe a procedure of fixing the knife adjusting bolt 12 according to the present invention.

In setting the knife 10 in the knife setting gauge 1, the fixing member 20 is previously installed on the adjusting bolt 12 at a suitable spacing from the knife bottom surface. The clamp bolt 16 may be previously screwed into the threaded hole 18 with the its head clear of the fixing member 20. The stop bolt 26 may also be screwed into its threaded holes 27 in the fixing member 20, but with its advancing top end clear of the knife bottom surface. Knife height adjustment is accomplished by turning each of the adjusting bolts 12 so that the desired knife height "L" is obtained throughout the knife length. When the knife adjustment is thus completed, the adjusting bolt 12 is engaged with the threaded hole 14 such that the advancing side flank 12b of the bolt thread is pressed against the lower side flank 10a of the internal thread of the bolt receiving hole 14 as shown in upper part of FIG. 4.

Figure 4:
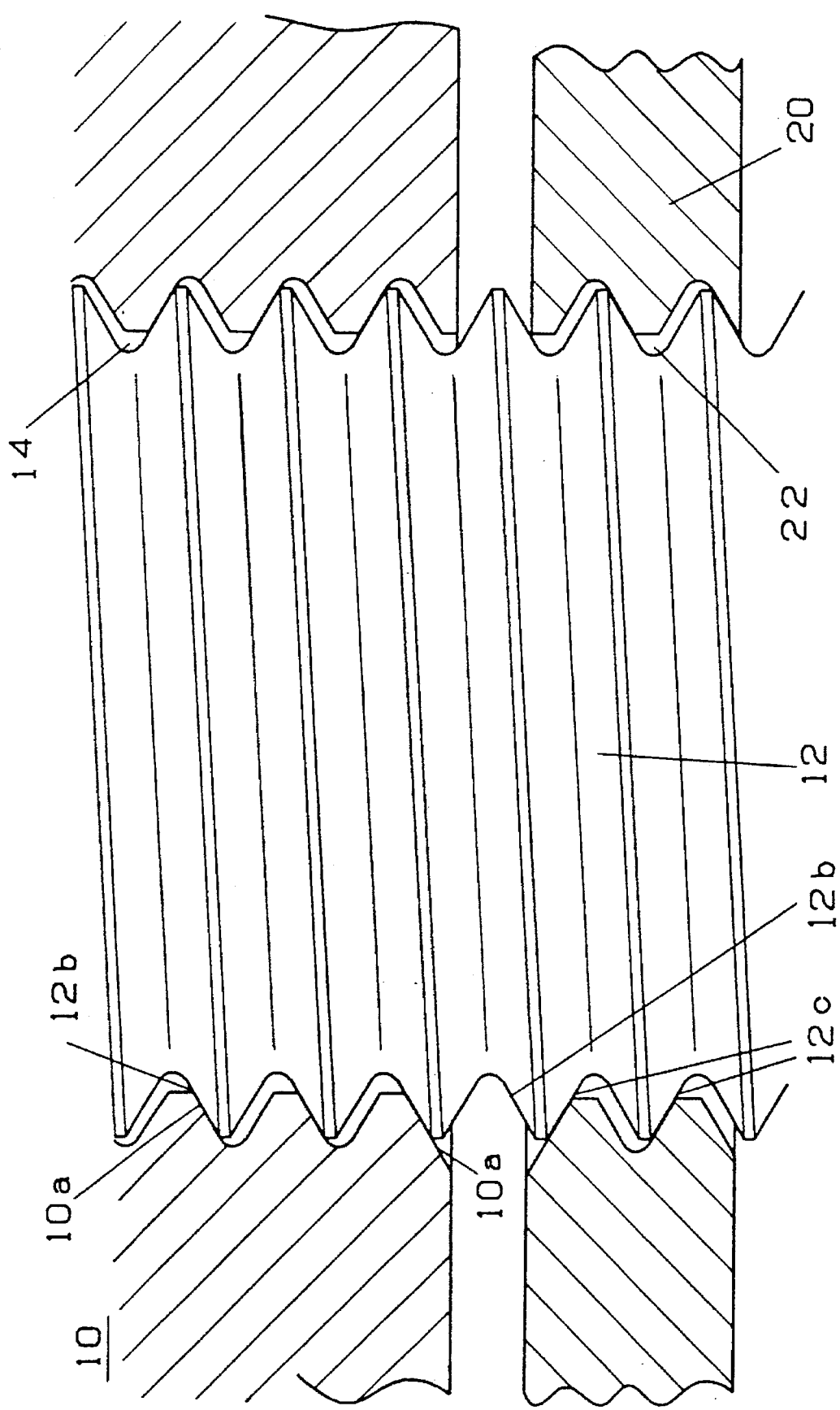
FIG. 4 is a magnified view illustrating the engagement between the external thread of the knife adjusting bolt and the internal thread of adjusting bolt receiving hole.

After the knife adjustment is over, the clamp bolt 16 is screwed in so that the fixing member 20 is positioned substantially in parallel to the knife bottom surface, and the stop bolt 26 is screwed in until its top end is just brought into contact with the knife bottom surface, as shown in FIG. 3. To fix the knife adjusting bolt 12, the clamp bolt 16 is turned or screwed in until it becomes tight. By so doing, the clamp bolt 16 acts to push the fixing member 20, which in turn forces the adjusting bolt 12 upward or in its advancing direction. Simultaneously, the tightening of the clamp bolt 16 causes the knife 10 to be pulled downward because of the thread engagement of the clamp bolt 16 and its receiving hole 18. As a result, the adjusting bolt 12 is fixed securely in the adjusted position with the advancing side flank 12b of its thread in pressing tight contact with the lower side flank 10a of the internal thread of the hole 14, as shown in FIG. 4. Because the parallel relationship of the fixing member 20 with respect to the knife bottom surface is maintained by the stop bolt 26 during the tightening of the clamp bolt 16, the adjusting bolt 12 is forced upward substantially in perpendicular relation to the knife bottom surface.

As it is apparent from the foregoing description, merely tightening the clamp bolt 16 after the knife adjustment is over fixes the adjusting bolt 12 in its adjusted position and, therefore, an adjustment error inherent to tightening by a conventional lock nut can be avoided and troublesome readjustment using the adjusting bolt and the lock nut for correcting the error need not be performed. Thus, the knife setting procedure can be expedited to reduce the downtime. In this embodiment, since the adjusting bolt 12 is forced substantially in perpendicular relation to the knife bottom surface, the bolt can be fixed in a stable condition against application of variable load acting on the adjusting bolt during veneer peeling operation. That is, the adjusting bolt 12 is less susceptible to bending by application of the above load and, therefore, a change in the knife setting due to such bending will not occur.

As is apparent to those skilled in the art, the above-described procedure of fixing the knife adjusting bolt 12 after the knife adjustment is just an example shown for the sake of illustration of the invention and other steps of procedure may be taken to achieve the same effect. For example, the clamp bolt 16 and the stop bolt 26 may be inserted into their respective holes 24, 18 and 27 after the knife adjustment is over.

The following will describe other preferred embodiments of the invention. It is noted that in the following description of various embodiments, like elements or members are designated by like reference numerals.

EMBODIMENT 2:

The use of the stop bolt 26 for maintaining the parallelism between the fixing member 20 and the knife bottom surface in the first embodiment is advantageous when the portion of the adjusting bolt 12 that projects out from the knife bottom is relatively long and, therefore, the adjusting bolt should be forced as perpendicularly as possible relative to the knife bottom surface, as explained in the above.

Figure 5:
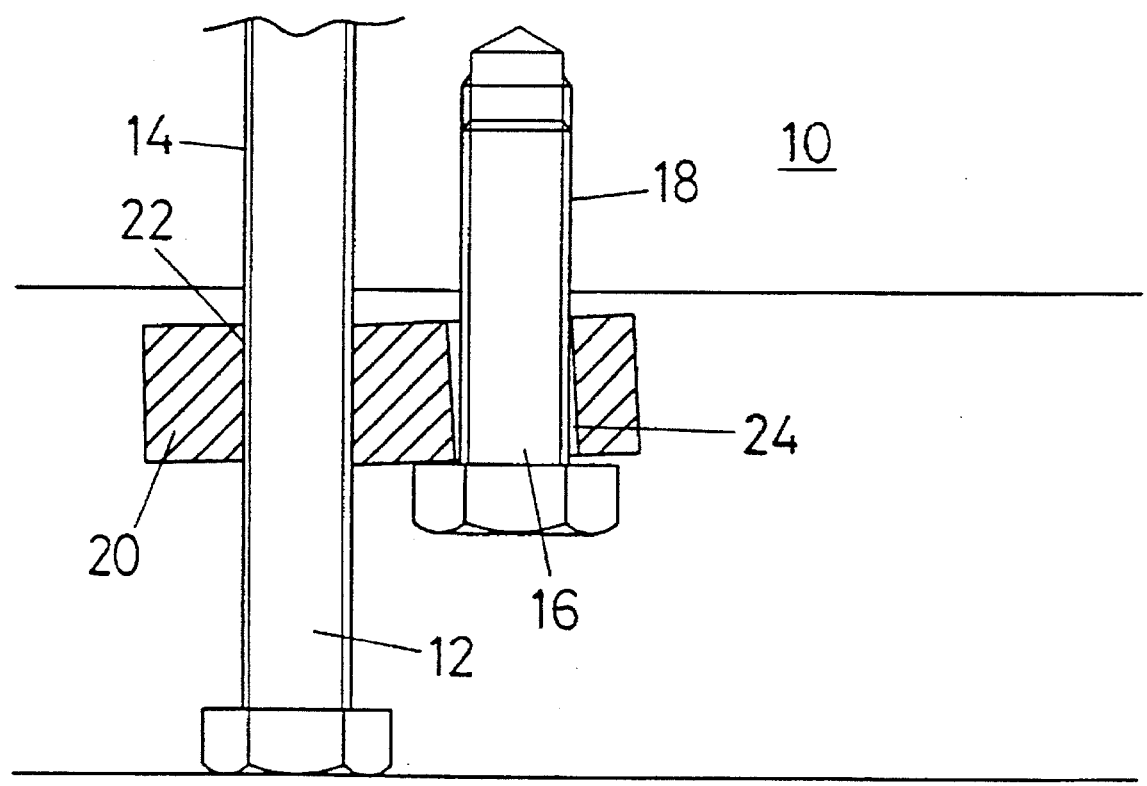
FIG. 5 is a front view similar to FIG. 3, but showing a second embodiment according to the invention.

It is to be noted, however, that the provision of the stop bolt 26 of FIG. 3 or a similar element is not an essential feature of the present invention and, therefore, the knife 10 may dispense with the stop bolt 26. The second embodiment shown in FIG. 5 differs from the first embodiment in that the knife 10 has no bolt for maintaining the parallelism of the fixing member 20 relative to the knife bottom surface. When the clamp bolt 16 is tightened in this embodiment, the fixing member 20 may be displaced out of the parallel relationship, as shown in FIG. 5. However, this embodiment is safely applicable to a veneer knife 10 wherein the projecting portion of the adjusting bolt 12 is short enough to resist the above bending force by application of the load during veneer cutting operation.

Figure 6:
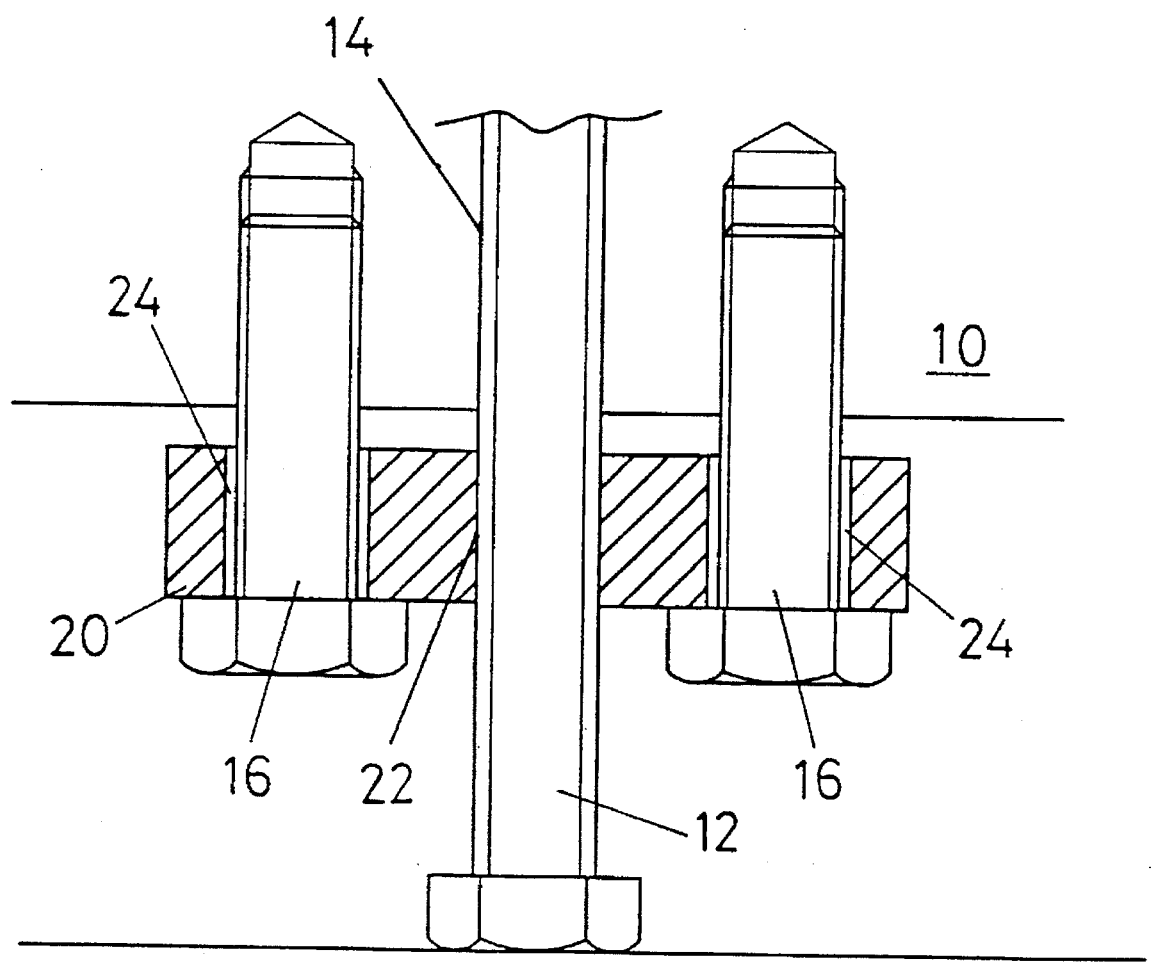
FIG. 6 is a front view showing a third embodiment according to the invention.

EMBODIMENT 3:

In the third embodiment shown in FIG. 6, the fixing member 20 has in the center thereof a threaded hole 22 for receiving therethrough the knife adjusting bolt 12 and at opposite sides of the center hole 22 two plain holes 24, 24 for receiving therethrough the respective clamp bolts 16, 16. Tightening the two clamp bolts 16, 16 after the knife height adjustment forces the adjusting bolt 12 upward to fix the same bolt securely.

The use of two clamp bolts 16, 16 provides an effect of increasing the fixing force applied to the adjusting bolt 12 by way of the fixing member 20, as well as an effect of helping to maintain the perpendicular relationship of the adjusting bolt 12 with respect to the knife bottom surface by tightening the two clamp bolts alternately. Since the adjusting bolt 12 is forced from its opposite lateral sides, the fixing force is applied more uniformly to the entire thread engagement of the adjusting bolt 12 and its threaded hole 14. As a modification of this embodiment, the knife 10 may have three or more clamp bolts 16 arranged around the adjusting bolt 12.

As a further modification of this third embodiment, the fixing member 20 may be extended along the longitudinal direction of the knife 10 long enough to have two or more adjusting bolt receiving holes 22 each flanked by two opposite clamp bolt receiving holes 24 so that a clamp bolt 16 located between any two adjacent adjusting bolts 12 is shared by such two adjusting bolts. Such alternate arrangement of the clamp bolt 16 and the knife adjusting bolt 12 in a single fixing member 20 can reduce the number of clamp bolts 16 for a given number of adjusting bolts 12, thereby facilitating the knife setting procedure. It is noted, however, that the fixing member 20 in such embodiment should be rigid enough to resist the clamping force exerted by a plurality of clamp bolts 16.

Figure 7:
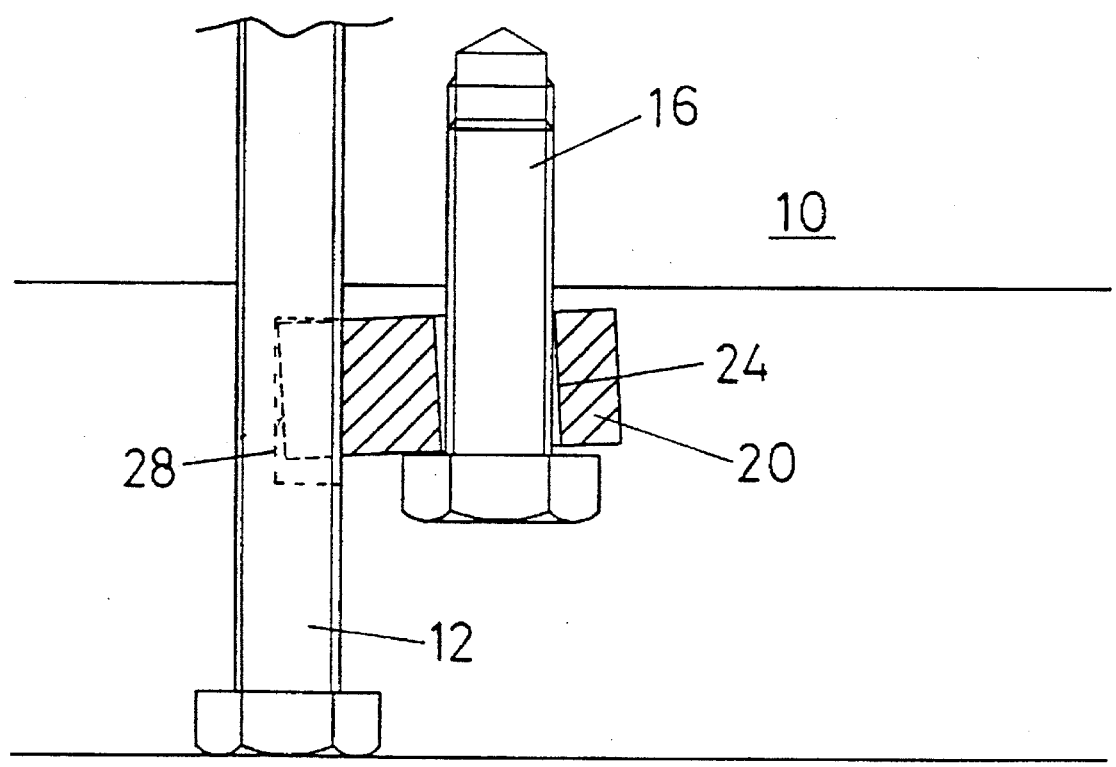
FIG. 7 is a front view showing a fourth embodiment according to the invention.

EMBODIMENT 4:

Referring to FIG. 7 showing a fourth embodiment of the invention, the knife adjusting bolt 12 has at least one slot 28 formed to extend radially toward the axis of the bolt 12 and axially for a distance long enough to receive therein one end of the fixing member 20 mounted on the clamp bolt 16. In this embodiment, with one end of the fixing member 20 inserted in the slot 28 as shown in FIG. 7, the clamp bolt 16 is tightened thereby to force the knife 10 downward and the adjusting bolt 12 upward through the pressing contact between the above end of the fixing member 20 and the upper wall in the slot 28.

This embodiment can be practiced only when the opening of one of the slots 28 faces the clamp bolt 16 so that the one end of the fixing member 20 can be received in the slot when the knife 10 has just been adjusted. For this reason, the slot 28 should be formed with an opening as large as possible in the circumferential direction of the adjusting bolt 12 with the required strength of the adjusting bolt taken into consideration. Since the fixing member 20 is not mounted on the adjusting bolt through thread engagement, this embodiment is advantageous in that the fixing member can be removed from the adjusting bolt 12 easily merely by loosening the clamp bolt 16.

The above four embodiments, wherein the adjusting bolt 12 is forced axially upward by the fixing member 20, are applicable also to an adjusting bolt having a square thread.

EMBODIMENT 5:

This and the following embodiments are featured by the use of a fixing member 21 which is made of a resilient material.

Figure 8:
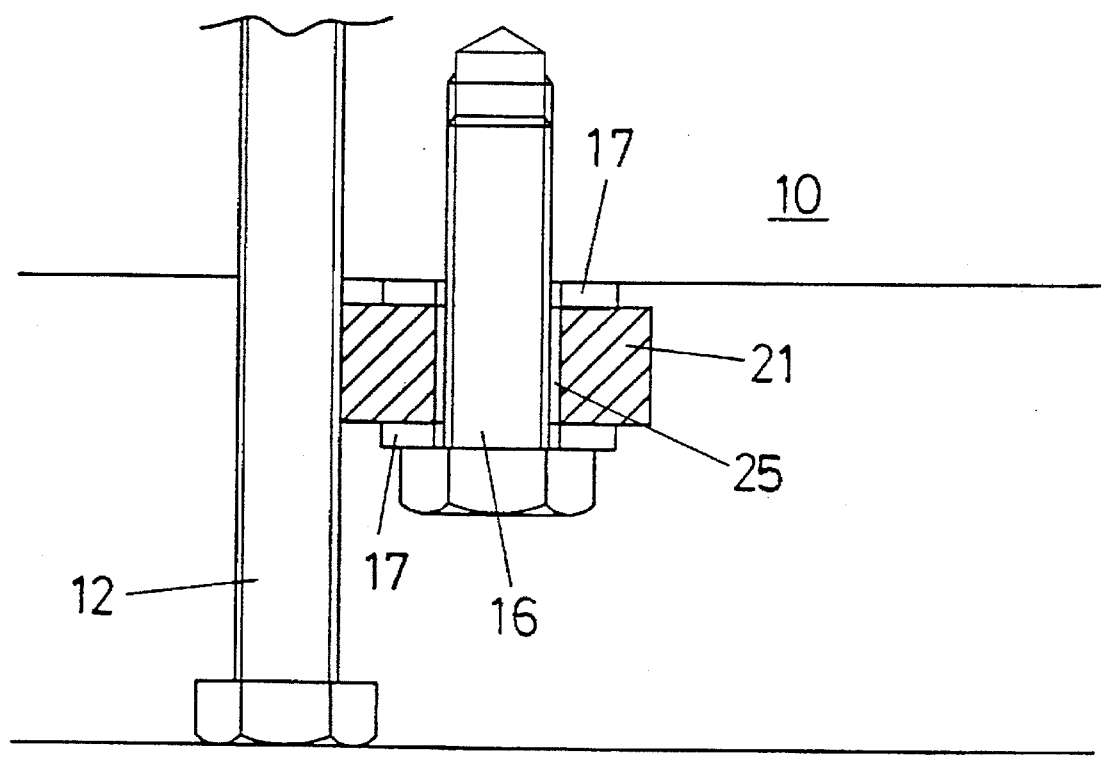
FIG. 8 is a front view of a fifth embodiment according to the invention, showing a state where the knife adjusting bolt is yet to be fixed.

Referring to FIG. 8 of a fifth embodiment of the invention, showing a state where the clamp bolt 16 is yet to be tightened, there is provided a fixing member 21 made of any suitable resilient material such as silicon rubber and having a plain hole 25 through which the clamp bolt 16 is inserted. The fixing member 21 is so sized that one lateral side thereof is located close to or just touches the external thread of the knife adjusting bolt 12 as shown in FIG. 8. As shown in the drawing, two washers 17, 17 are installed on the clamp bolt 16 on opposite axial sides of the fixing member 21.

Figure 9:
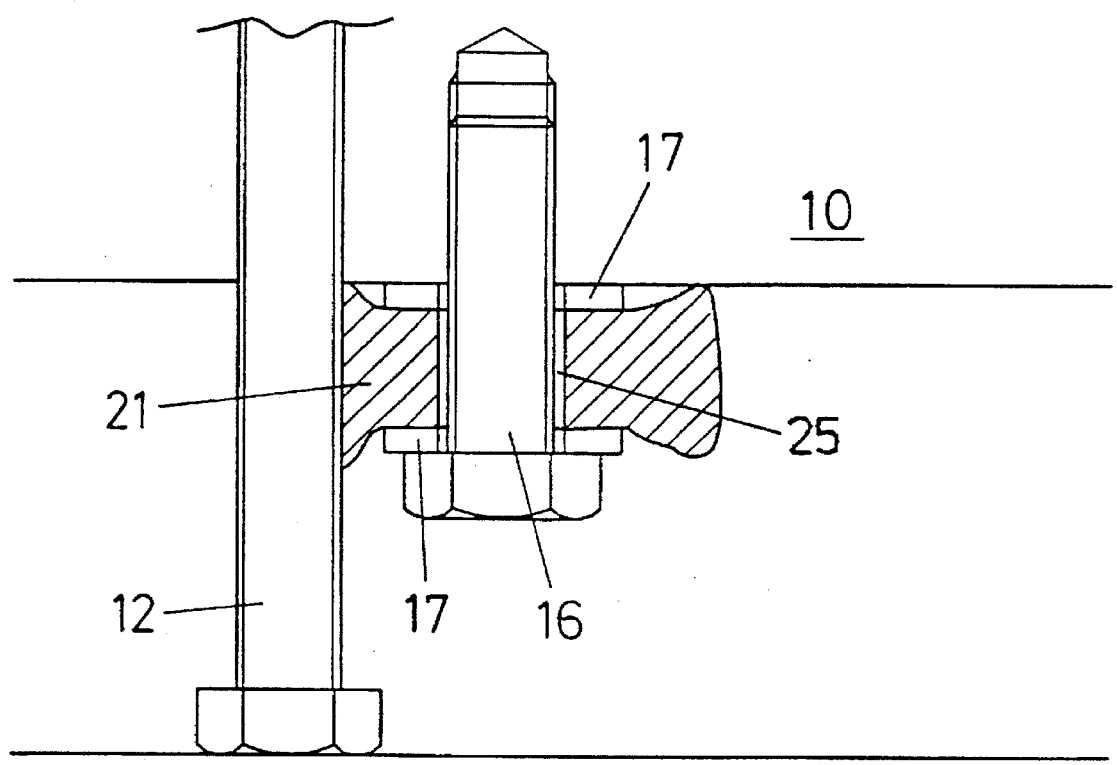
FIG. 9 a view similar to FIG. 8, but showing a state where the knife adjusting bolt has been fixed.

According to the adjusting bolt fixing method in this embodiment, tightening the clamp bolt 16 causes the fixing member 21 to be compressed axially of the bolt and deformed to expand laterally as shown in FIG. 9. The fixing member 21 thus expanding presses the periphery of the adjusting bolt 12. In so doing, the adjusting bolt 12 is forced laterally and the sloped advancing side flank 12b of the adjusting bolt thread is pressed tight against the mating lower side flank 10a of the internal thread of the adjusting bolt receiving hole 14 by the wedging action of the two threads, thereby fixing the adjusting bolt 12 in place.

Figure 10:
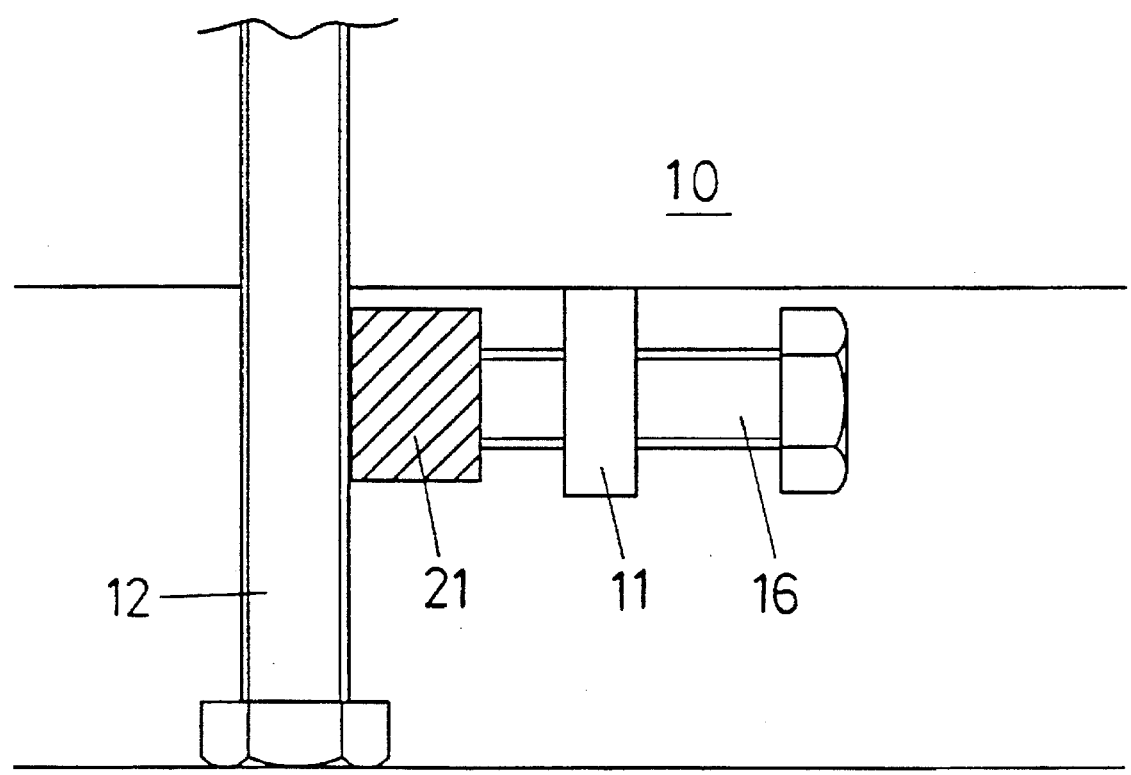
FIG. 10 is a front view showing a sixth embodiment according to the invention.

EMBODIMENT 6:

The embodiment of FIG. 10 differs from the above embodiment in that the resilient fixing member 21 is pressed laterally against the knife adjusting bolt 12 directly by the clamp bolt 16 disposed with its axis directed in perpendicular relation to the adjusting bolt 12. To support the clamp bolt 16 in a horizontal position, there is provided a mounting 11 fixed to the knife bottom surface and having a threaded hole through which the clamp bolt 16 is inserted. One end of the clamp bolt 16 remote from its head has the silicon rubber fixing member 21 attached thereto.

To fix the adjusting bolt 12, the clamp bolt 16 is turned to press the fixing member 21 against the periphery of the adjusting bolt 12. Fixing of the adjusting bolt 12 is accomplished in the same manner as in the above sixth embodiment.

As a modification from this embodiment, the resilient fixing member 21 may be attached directly to the knife bottom surface in proximity to the adjusting bolt 12 instead of being attached to the end of the clamp bolt.

Figure 11:
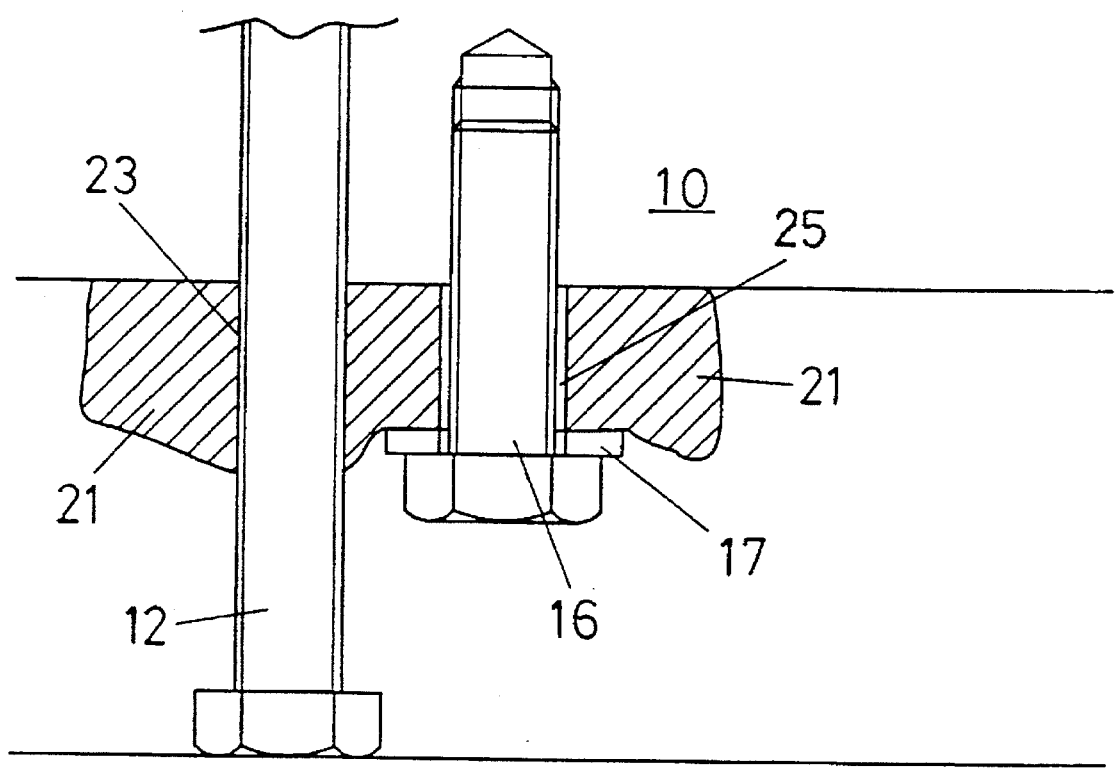
FIG. 11 is a front view showing a seventh embodiment according to the invention.
Figure 12:
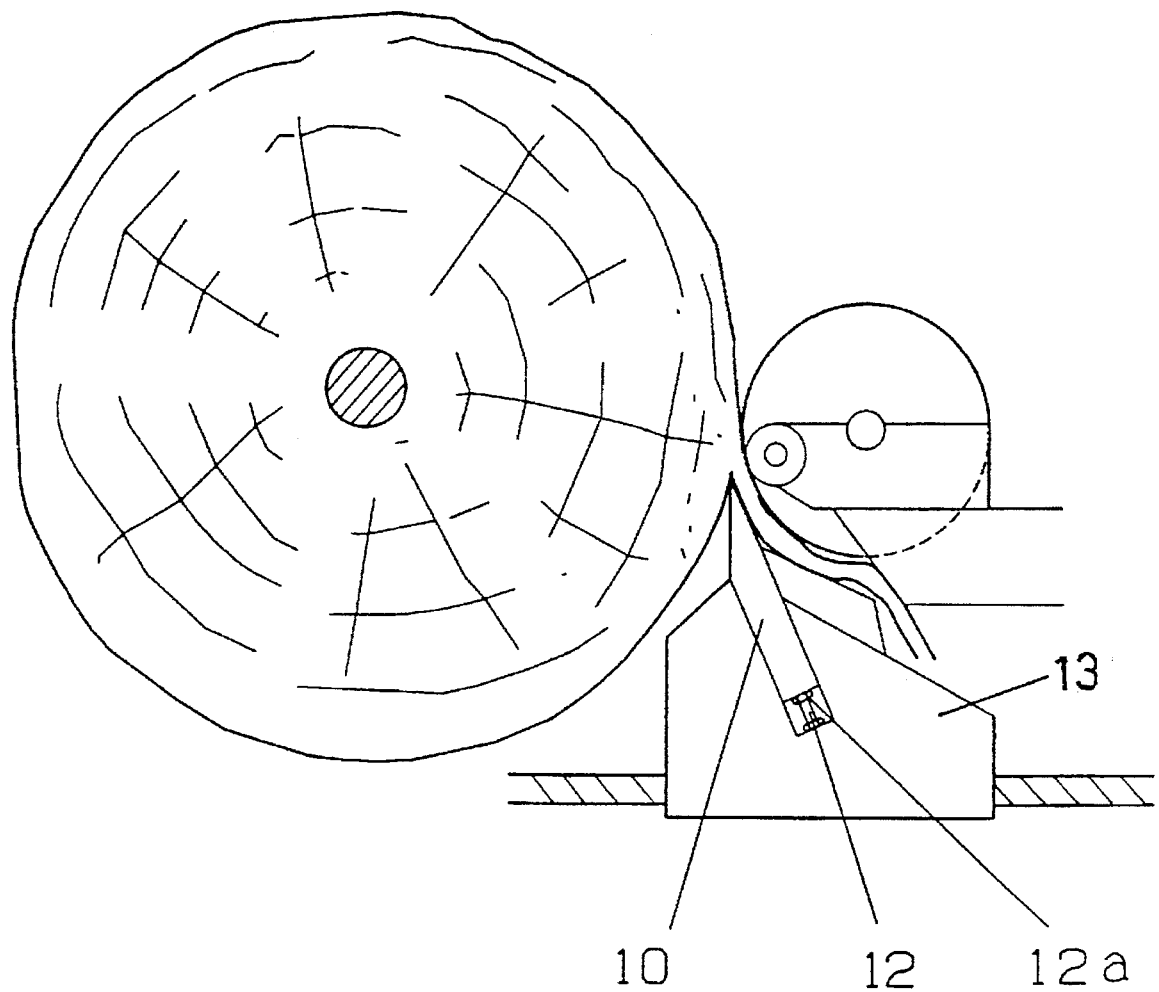
FIG. 12 is a side view showing a conventional veneer peeling knife having an adjusting bolt and a lock nut and mounted in a knife carriage of a veneer lathe.
Figure 13:
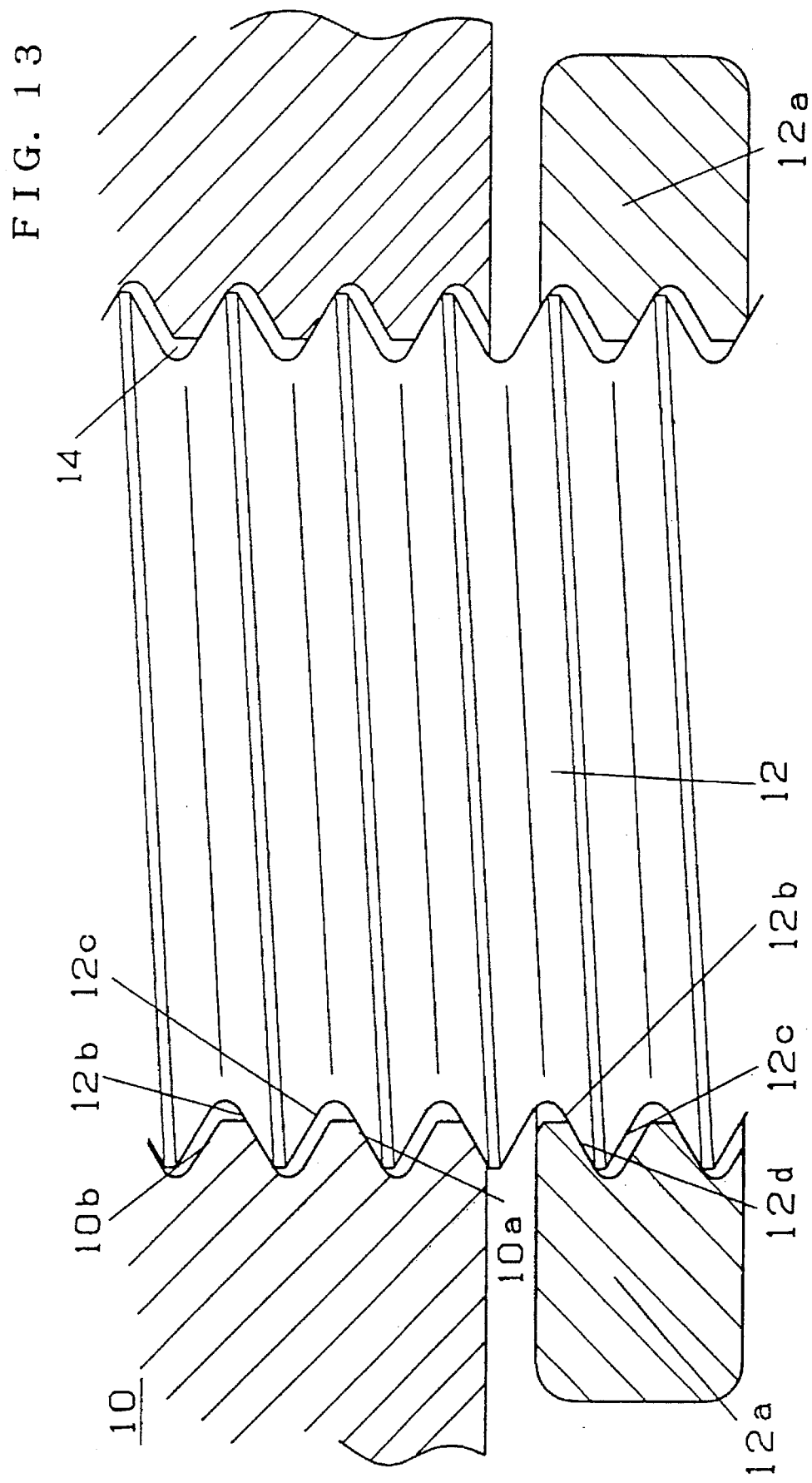
FIG. 13 is a magnified view of thread engagement of the knife adjusting bolt of FIG. 12 and a bolt receiving hole, showing a state where the lock nut is yet to be tightened.

EMBODIMENT 7:

Resilient fixing member 21 in the embodiment of FIG. 11 is provided with two plain holes 23 and 25 through which the adjusting bolt 12 and the clamp bolt 16 are inserted, respectively. As in the fifth embodiment of FIGS. 8 and 9, tightening the clamp bolt 16, the fixing member 21 is pressed and deformed to expand laterally as shown in FIG. 11 to exert a pressing force laterally to the knife adjusting bolt 12 thereby fixing the same bolt.

In the embodiments using a resilient fixing member, the knife can be made lighter than the embodiments using a rigid fixing member.

It is noted that the knife 10 does not have to be set in upright position as shown in FIG. 1, but the knife setting may be performed with the knife placed in the knife setting gauge 1 in the same tilted position as it is actually set in the knife carriage of a veneer lathe.

As it is now apparent from the foregoing description of the preferred embodiments of the invention, fixing of a knife adjusting bolt is accomplished by tightening the thread engagement as adjusted between the knife adjusting bolt and its threaded hole. Unlike the conventional method using a lock nut which, when tightened, pushes the adjusted knife upward, causing an error corresponding to the backlash present in the thread engagement, the desired knife height achieved by initial adjustment can be maintained merely by tightening the clamp bolt. Thus, the knife setting according to the method of the present invention is accomplished by a simplified procedure calling for no repeated and troublesome readjustment by a skilled workman to compensate for the error.

Since the load acting downward during veneer peeling operation is received at the tight thread engagement between the advancing side flank of the adjusting bolt thread and the lower side flank of the internal thread of the adjusting bolt receiving hole, the load can be supported safely and there is no fear of loosening of thread engagement as encountered with in the conventional veneer knife using a lock nut. Therefore, the veneer lathe can be operated safely for a prolonged period of time without having an error in the adjusted knife height. Freedom of such error in the knife height during the veneer peeling operation contributes greatly to production of a quality veneer sheet having no rough surface caused by maladjustment of the knife cutting edge position. As understood by those skilled in the art, this is effective particularly in peeling a relatively thin sheet of veneer.

In those embodiments of the invention having an arrangement that permits pressing the adjusting bolt substantially perpendicular with respect to the knife bottom surface, the adjusting bolt having a relatively long portion projecting out from the knife bottom surface can safely resist a high magnitude of load which is applied to the knife during veneer peeling operation and may cause the adjusting bolt to be bent.

Additionally, since the fixed state of the adjusting bolt is maintained by tight thread engagement between the advancing side flank of the external thread of the adjusting bolt and the lower side flank of the internal thread of the adjusting bolt receiving hole, the pressing force to keep the adjusting bolt fixed can be maintained over a much longer period of time than heretofore. Such tight thread engagement prevents the knife from being brought out of adjustment while it is being moved from the knife setting gauge to the veneer lathe and installed on the knife carriage.

It is to be understood by those skilled in the art that other changes and modifications may be made in the invention, in the light of the foregoing teachings, without departing from the scope of the invention defined in the appended claims.

What is claimed is:

1. A method of fixing an adjusting bolt of a veneer peeling knife for a veneer lathe after an adjustment by said adjusting bolt to position the top cutting edge of said knife at a desired height is over, said knife having formed in the bottom thereof a threaded hole for receiving therein said adjusting bolt by thread engagement, said adjusting bolt being rotatable for adjustably moving said knife relatively to said adjusting bolt and being formed with an external thread having a first flank on the advancing side and a second flank on the retracting side as seen in the direction of forward movement of said adjusting bolt effected when said adjusting said bolt is screwed into said threaded hole in the the bottom, said adjusting bolt receiving threaded hole being formed with an internal thread having a first flank on the upper side thereof and a second flank on the lower side thereof, wherein said knife includes fixing means, and the fixing of said adjusting bolt is accomplished by forcing the adjusting bolt by said fixing means in such a direction that said advancing side flank of the external thread of the adjusting bolt is kept in a pressed contact with said lower side flank of the internal thread of said adjusting bolt receiving threaded hole.

2. A method of fixing the adjusting bolt according to claim 1, wherein said knife further includes means for pressing said fixing means in a direction that effects said pressed contact between said two flanks.

3. A method of fixing the adjusting bolt according to claim 2, wherein said fixing means includes a rigid member which is disposed below the bottom surface of said knife and formed with a threaded hole through which said adjusting bolt is inserted by thread engagement.

4. A method of fixing the adjusting bolt according to claim 3, wherein said rigid fixing member is spaced from the bottom surface of said knife at least before said adjusting bolt is fixed.

5. A method of fixing the adjusting bolt according to claim 4, wherein said knife further includes means for maintaining said rigid fixing member substantially in parallel to the bottom surface of said knife.

6. A method of fixing the adjusting bolt according to claim 4, wherein said knife has formed in the bottom thereof adjacent said threaded hole at least one second threaded hole, said rigid fixing member has formed therethrough a plain hole adjacent said threaded hole in the rigid fixing member, and said pressing means includes at least one pressing bolt inserted into said second threaded hole in the knife bottom by thread engagement and through said plain hole in the rigid member, whereby screwing said at least one pressing bolt with its head in contact with the bottom surface of said rigid fixing member into said second threaded hole in the knife bottom pushes said rigid member upward and simultaneously pulls said knife downward toward said rigid fixing member.

7. A method of fixing the adjusting bolt according to claim 6, wherein said pressing means includes two pressing bolts disposed on opposite sides of said adjusting bolt.

8. A method of fixing the adjusting bolt according to claim 2, wherein said fixing means includes a resilient member which is disposed below the bottom surface of said knife and deformable so as to urge at least part of the outer periphery of said adjusting bolt in the direction substantially perpendicular to the axis of said adjusting bolt.

9. A method of fixing the adjusting bolt according to claim 8, wherein said pressing means includes a pressing bolt which is arranged so as to press said resilient fixing member for the deformation thereof when said pressing bolt is screwed in its forward movement direction.

10. A method of fixing the adjusting bolt according to claim 9, wherein said knife has formed in the bottom thereof adjacent said threaded hole a second threaded hole, said resilient fixing member has formed therethrough a plain hole, and said pressing bolt is inserted into said second threaded hole by thread engagement and also through said plain hole in the fixing member so that screwing said pressing bolt in its forward movement direction causes said resilient fixing member to be deformed laterally in pressing contact with the adjacent part of the adjusting bolt outer periphery.

11. A method of fixing the adjusting bolt according to claim 9, wherein said knife further includes means for supporting said pressing bolt with its axis extending perpendicularly with respect to the axis of said adjusting bolt so that screwing said pressing bolt in its forward movement direction causes said resilient fixing member to be deformed in pressing contact with the adjacent part of the adjusting bolt outer periphery.

12. A veneer peeling knife of a veneer lathe comprising an adjusting bolt screwed into a threaded hole formed in the bottom of said knife for adjustably moving the knife relative to said adjusting bolt to position the top cutting edge of said knife at a desired height, said adjusting bolt being formed with an external thread having a first flank on the advancing side and a second flank on the retracting side as seen in the direction of forward movement of said adjusting bolt effected when said adjusting bolt is screwed into said threaded hole, said threaded hole in the knife bottom being formed with an internal thread having a first flank on the upper side thereof and a second flank on the lower side thereof, means for fixing said adjusting bolt by forcing the adjusting bolt in such a direction that said advancing side flank of the external thread of the adjusting bolt is kept in a pressed contact with said lower side flank of the internal thread of said adjusting bolt receiving threaded hole, and means for pressing said fixing means in a direction that effects said pressed contact between said two flanks.

13. A veneer peeling knife according claim 12, wherein said fixing means includes a rigid member which is disposed below the bottom surface of said knife and formed with a threaded hole through which said adjusting bolt is inserted by thread engagement.

14. A veneer peeling knife according to claim 13, further comprising means for maintaining said rigid fixing member spaced from the bottom surface of said knife at least before said adjusting bolt is fixed and also maintaining said rigid fixing member substantially in parallel to the bottom surface of said knife.

15. A veneer peeling knife according to claim 14, wherein said knife has formed in the bottom thereof adjacent said threaded hole at least one second threaded hole, said rigid fixing member has formed therethrough a plain hole adjacent said threaded hole in the rigid fixing member, and said pressing means includes at least one pressing bolt inserted into said second threaded hole in the knife bottom by thread engagement and through said plain hole in the rigid member, whereby screwing said at least one pressing bolt with its head in contact with the bottom surface of said rigid fixing member into said second threaded hole in the knife bottom pushes said rigid member upward and simultaneously pulls said knife downward toward said rigid fixing member.

16. A veneer peeling knife according to claim 15, wherein said pressing means includes two pressing bolts disposed on opposite sides of said adjusting bolt.

17. A veneer peeling knife according to claim 12, wherein said fixing means includes a resilient member which is disposed below the bottom surface of said knife and deformable so as to urge at least part of the outer periphery of said adjusting bolt in the direction substantially perpendicular to the axis of said adjusting bolt.

18. A veneer peeling knife according to claim 17, wherein said pressing means includes a pressing bolt which is arranged so as to press said resilient fixing member for the deformation thereof when said pressing bolt is screwed in its forward movement direction.

19. A veneer peeling knife according to claim 18, wherein said knife has formed in the bottom thereof adjacent said threaded hole a second threaded hole, said resilient fixing member has formed therethrough a plain hole, and said pressing bolt is inserted into said second threaded hole by thread engagement and also through said plain hole in the fixing member so that screwing said pressing bolt in its forward movement direction causes said resilient fixing member to be deformed laterally in pressing contact with the adjacent part of the adjusting bolt outer periphery.

20. A veneer peeling knife according to claim 17, wherein said knife further includes means for supporting said pressing bolt with its axis extending perpendicularly with respect to the axis of said adjusting bolt so that screwing said pressing bolt in its forward movement direction causes said resilient fixing member to be deformed in pressing contact with the adjacent part of the adjusting bolt outer periphery.

* * * * *

UNITED STATES PATENT AND TRADEMARK OFFICE
CERTIFICATE OF CORRECTION

PATENT NO.  : 5,662,151
DATED       : September 2, 1997
INVENTOR(S) : Masaru Koike It is certified that error appears in the above-indentified patent and that said Letters Patent is hereby corrected as shown below:

Column 8, line 48, delete "said" (first occurrence).

Column 8, line 48, delete "the" (second occurrence), and substitute --knife--.

Signed and Sealed this

Third Day of February, 1998

BRUCE LEHMAN

Attest:

Attesting Officer

Commissioner of Patents and Trademarks